United States Patent
Longmoore

(10) Patent No.: US 7,569,279 B2
(45) Date of Patent: Aug. 4, 2009

(54) COLD SEAL RELEASE FILMS AND METHODS OF MAKING SAME

(75) Inventor: Kenneth Longmoore, Newark, DE (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 172 days.

(21) Appl. No.: 11/462,446

(22) Filed: Aug. 4, 2006

(65) Prior Publication Data

US 2008/0032141 A1    Feb. 7, 2008

(51) Int. Cl.
*B32B 27/00*   (2006.01)
*B32B 9/04*    (2006.01)

(52) U.S. Cl. ........................................ 428/447; 428/500

(58) Field of Classification Search ........................ None
See application file for complete search history.

(56) References Cited

U.S. PATENT DOCUMENTS

| 5,482,780 | A | 1/1996 | Wilkie |
| 5,792,549 | A | 8/1998 | Wilkie |
| 5,981,047 | A | 11/1999 | Wilkie |
| 6,022,612 | A | 2/2000 | Wilkie |
| 6,074,731 | A | 6/2000 | Wilkie |
| 6,602,609 | B1 * | 8/2003 | Kong ........................ 428/447 |

* cited by examiner

*Primary Examiner*—Sheeba Ahmed
(74) *Attorney, Agent, or Firm*—Caesar, Rivise, Bernstein, Cohen & Pokotilow Ltd.

(57) ABSTRACT

A cold seal release film including a cold seal release layer employing a silicone oil slip agent therein. The release layer is oxidatively treated to a level to reduce the cold seal release force by at least 25%, as compared to the cold seal release force without oxidative treatment of the release layer. A method of forming the cold seal release film with an improved cold seal release layer as described above also forms a part of the present invention.

25 Claims, No Drawings

COLD SEAL RELEASE FILMS AND METHODS OF MAKING SAME

FIELD OF INVENTION

This invention relates generally to release films and methods of making same, and more particularly to an improved film and method for enhancing the release properties of the film.

BACKGROUND OF THE INVENTION

Cold seal release films are well known in the art as exemplified in Wilkie et al. U.S. Pat. No. 5,482,780; Wilkie U.S. Pat. No. 5,792,549; Wilkie U.S. Pat. No. 5,981,047; Wilkie U.S. Pat. No. 6,022,612 and Wilkie U.S. Pat. No. 6,074,731. The subject matter of all of the above-identified patents collectively referred to as the "Wilkie patents") is fully incorporated herein by reference.

Cold seal release films are most commonly used as the outside web or film of a multi-web packaging structure. In common practice, the release film is a clear web that is reverse printed and adhesive laminated to an inner web such as an opaque film (in a candy bar wrap) or a metallized film (in a breakfast bar wrap). After the two films are laminated a layer of cold seal adhesive is applied to the inner web as the web is wound into a roll. The cold seal release film serves the following functions: 1) it provides a transparent web which can be reverse printed so that the decoration is "buried" beneath the clear web to prevent the ink from being worn away; 2) it provides the desired slip properties so that the laminate will run effectively on packaging machines and 3) it provides a surface with low adhesion to the cold seal adhesive so that the laminate roll can be unwound during a packaging operation, with the adhesive remaining on the desired surface of the lamination.

The term "cold seal" refers to a package seal provided at ambient temperature, typically 15-26° C., as opposed to a seal provided with a high-temperature sealant polymer that requires heat and pressure to create the seal. Because of their ability to form seals without heat, cold seal adhesives are ideally suited to the packaging of heat-sensitive products, such as bakery and confectionary products. In addition, employing cold seal adhesives allows faster packaging speeds to be achieved relative to the use of high-temperature sealant polymers.

Cold seal release films typically are multilayer polymeric films having a central core and skin layers located on opposed sides of the core. One of the skin layers (the outer skin layer) is a cold seal release layer designed to permit a cold seal adhesive to be separated therefrom for subsequent use in providing a sealing function. As noted earlier, cold seal release films are typically laminated to another, inside web, and in these latter constructions the opposed skin layer of the release film (i.e., the layer opposite the release layer) is generally a surface-treated (e.g., oxidatively treated, such as by corona or flame treatment), often reverse printed, and then adhesive laminated to the inside web. The inner surface of the inside web is then oxidatively treated to provide a cold seal receptive layer for receiving and retaining a cold seal adhesive composition thereon.

Cold seal release films within the scope of this invention can be utilized by themselves, i.e., without being laminated to another, inside web. In these latter applications the skin layer of the film opposed to the cold seal release layer is commonly oxidatively treated by corona or flame treatment to provide a cold seal receptive layer for receiving and retaining a cold seal adhesive composition thereon.

In all embodiments of this invention, it is necessary to achieve improved cold seal release properties in the cold seal release skin layer to reliably permit the separation of the cold seal adhesive from the cold seal release layer when the film, either by itself or laminated to another inside film, is being dispensed for use in packaging applications.

In selected cold seal release films printed indicia is provided directly on the cold seal release surface. In order to provide good ink receptivity in these latter films it generally has been necessary to oxidatively treat the cold seal release skin layer by corona treatment or flame treatment. Unfortunately, in many prior art cold seal release films the oxidative treatment of the surface of the release layer diminishes the release properties of that layer, thereby resulting in the formation of a product wherein the cold seal adhesive does not effectively and reliably separate from the cold seal release layer without damaging the film.

In a number of the Wilkie patents the specifically disclosed polymeric compositions employed in the release layer in combination with a cross-linked silicone, non-migratory slip agent sold under the trade name Tospearl by Toshiba Company are described as providing good release properties, either with or without corona treatment. Specifically, Wilkie invented polymer formulations for the cold seal release layer. The reason disclosed for adding the slip agent to the release layer in the Wilkie formulations was to reduce the coefficient of friction (C.O.F.) to an acceptable level. In addition to disclosing the use of a cross-linked silicone as the non-migratory slip agent to reduce C.O.F., a number of the Wilkie patents disclose the use of relative minor amounts of other migratory slip/anti-block and anti-static agents to provide this function. There is no disclosure or suggestion that the inclusion of a slip agent or antiblock agent has any possible effect on the release properties of the release layer.

A general concern in the prior art teachings is that oxidatively treating the release surface, although possibly necessary to provide desired adhesion of printing inks to that surface, can deteriorate the cold seal release properties of the film. For example, note column 9, lines 61-64 in Wilkie U.S. Pat. No. 5,981,047.

Wilkie U.S. Pat. No. 5,792,549, identified earlier herein, discloses specific polymer compositions for the release layer, which employ a non-migratory slip agent that is disclosed as being present in an amount sufficient to decrease the coefficient of friction of the release layer. The '549 patent discloses the optional use of non-migratory slip agents in connection with certain formulations, and also other additives, which are described as optional, such as saturated and unsaturated amides having from 16-22 carbon atoms; zinc stearate; calcium stearate; silicone oil; glycerol monostearate; amines; and finely divided inorganic particles. These optional additives are described as being usable in the range of 0-10,000 parts per million. Interestingly there are no specified benefits that are stated to be achieved by using any of these optional additives; nor is there any suggestion that these additives should be employed with or without oxidative treatment of the skin layer.

The thrust of the disclosures in the Wilkie patents is that desirable release properties can be maintained in the release skin layer even if it is necessary to corona or flame treat that layer. There is absolutely no suggestion in the Wilkie patents that the use of any additives can be employed in a manner to actually permit enhancing the release properties of the skin layer by oxidative treatment of the skin layer.

SUMMARY OF THE INVENTION

A cold seal release film of this invention includes a cold seal release layer forming one surface of the film, said cold seal release layer including a silicone oil slip agent therein, said one surface being oxidatively treated to enhance the release properties of the release layer.

Preferably, the cold seal release films of this invention are employed in packaging films and include an inner skin layer opposite the cold seal release layer laminated to a separate inner web or film through a laminating adhesive. In this latter embodiment the innermost surface of the inner film preferably is oxidatively treated to receive and retain a cold seal adhesive thereon. Thus, the cold seal adhesive is on the surface of the packaging film opposed to the cold seal release layer.

In the preferred cold seal release films of this invention the inner skin layer is oxidatively treated to provide enhanced retention to printing inks and laminating adhesives.

In accordance with this invention the inner skin layer of the cold seal release films can be oxidatively treated to receive a cold seal adhesive thereon, as opposed to receiving a laminating adhesive for use in attaching the cold seal release films to a separate inner film or web.

In the most preferred embodiments of this invention the cold seal release layer comprises predominantly one or more polyolefin polymers.

Most preferably the silicone oil is polydimethylsiloxane (PDMS).

In the most preferred construction the cold seal release layer includes a matte finish having a 45 degree gloss less than 30; more preferably 15 or less and most preferably 10 or less. Gloss is determined by ASTM 2457 at a 45-degree angle. It is in connection with matte finish release layers that it is most difficult to establish desirable/acceptable release properties from a cold seal adhesive composition.

Preferably the cold seal release layer has a static C.O.F. less than 0.5 and a kinetic C.O.F. less than 0.4. More preferably the static C.O.F. is less than 0.35 and the kinetic C.O.F. is less than 0.25.

In the most preferred embodiment of this invention the silicone oil should be present in an amount of at least 500 parts per million and most preferably in the range of 1000 to 2000 parts per million. Applicant surprisingly determined that by employing a silicone oil slip agent in well known matte surface formulations and at least one non-matte surface formulation the cold seal release properties actually could be enhanced by oxidative treatment, such as corona treatment. Prior to the instant invention the best that could be expected, in accordance with the prior art teachings, was that the release properties of the release layer would not be diminished by oxidative treatment of the layer.

A method of making a packaging film including a cold seal release layer thereon in accordance with this invention includes the steps of forming a film with a polymer composition having cold seal release properties, including in that polymer composition a silicone oil slip agent therein and oxidatively treating the cold seal release layer at a level to reduce the cold seal release force by at least 25%.

In accordance with the preferred method of this invention the cold seal release layer is provided by predominantly one or more polyolefin polymers.

In accordance with the preferred method the oxidative treatment the cold seal release layer is by a corona treatment process.

Preferably the method of this invention is carried out to improve the release properties of a cold seal release layer having a matte finish with a 45 degree gloss less than 30; more preferably 15 or less and most preferably 10 or less.

In accordance with the preferred embodiment of this invention, the silicone oil slip agent is added in an amount of at least 0.05% of the weight of the release layer, and even more preferably in an amount of at least 0.1% of the release layer.

In accordance with the most preferred method of this invention the silicone oil slip agent that is included in the cold seal release layer is polydimethylsiloxane.

DESCRIPTION OF THE PREFERRED EMBODIMENT OF THIS INVENTION

This invention is directed to a cold seal release film, which preferably is a biaxially oriented multilayer polymeric film. In accordance with the broadest aspects of this invention both the film and method of making the film can be employed in connection with cold seal release films having either a matte surface or a non-matte surface. However, in the most preferred embodiments of this invention the release properties are enhanced in connection with a matte surface cold seal release film. The matte surface is provided in an outer skin layer by blending two or more incompatible copolymers. Such skin layers are well known in the art and are specifically disclosed in a number of the Wilkie patents identified earlier herein. For example, note Wilkie U.S. Pat. No. 5,981,047 and Wilkie U.S. Pat. No. 6,022,612. These patents already have been fully incorporated herein.

In accordance with this invention the reference to a matte finish refers to a surface having a 45 degree gloss less than 30; more preferably 15 or less and most preferably 10 or less.

In the most preferred embodiment of this invention the cold seal release film is a multilayer structure having an internal core and opposed, relatively thin skin layers. Although the preferred embodiment of cold seal release films within this invention includes three layers, it is within the scope of this invention to include additional layers, including tie layers between the core layer and skin layers, as is necessary.

The core preferably is formed of polypropylene (as defined hereinafter) with one of the outer skin layers employing conventional matte-surface polymers to be described hereinafter and modified in accordance with this invention. The opposed skin layer preferably is a printing/laminating layer that is oxidatively treated to receive reverse printing thereon and also to receive a laminating adhesive for securing the release film to a separate, inner web or film to form a composite, packaging film with the release surface being the outer surface thereof. The inner surface of the innermost layer of the inner web or film, in the preferred embodiments, is a cold seal receptive surface. In accordance with the broadest aspect of this invention the innermost layer of the inner web or film can be any of the well known skin layers employed or known in the art as providing a receptive layer to receive and retain a cold seal adhesive thereon.

The cold seal release films of this invention also can be employed by themselves as packaging films, without being laminated to a separate, inner web or film. In these latter release films the skin layer opposed to the cold seal release layer preferably is oxidatively treated, such as by corona or flame treatment, to receive and retain a cold seal adhesive thereon. Most preferably the oxidative treatment is corona treatment.

The multilayer, cold seal release films in accordance with this invention typically have a thickness in the range of about 40-200 gauge (0.4-2 mils), with the thickness of the cold seal release skin layer being in the range of 4-20 gauge (0.04-0.2 mils), the thickness of the opposed cold seal receptive layer being in the range of 2-10 gauge (0.02-0.1 mils), and the core layer constituting the remaining thickness of the film.

In accordance with a unique aspect of the present invention, as will be described in detail hereinafter, the cold seal release layer is formulated to include a silicone oil slip agent therein, and is then oxidatively treated, preferably by corona treatment, to provide enhanced cold seal release properties. Most preferably the silicone oil slip agent is present in an amount of at least 0.05% (500 PPM); more preferably at least approximately 0.1% (1000 PPM) and preferably in the range of 0.1% (1000 PPM) and 0.2% (2000 PPM) based upon the weight of the skin layer. It should be understood that the balance of the skin layer can include polymeric materials that are disclosed as being conventionally employed in release layers.

In the following examples, the values of cold seal release force were determined in accordance with the following procedure:

A coating of the specified adhesive was applied via a Mayer rod onto the designated film substrate to provide an adhesive strength greater than 300 g/in. The coating was dried and then the release film was placed against the adhesive. Next, the two films were placed into a blocking jig where a contact force of 100 psi was applied. The samples were held in the jig for 16 hours at 22° C. The force to separate the release film from the adhesive was then measured.

Referring to Table I, four products including different commercial skin layer compositions demonstrate the effect of oxidatively treating (preferably corona treating) commercial skin layers to which a silicone oil slip agent had been added. The specific formulation of each of the skin layers in Table I is set forth in Table II.

TABLE I

| Designation | Matte composition | Corona Treatment | Room Temp. Blocking CSR force, g/in | 45 deg glass | COF static/kinatic |
|---|---|---|---|---|---|
| RLS control | none | no | 28/22 | 88 | .30/25 |
| 391-1 | Ampacat 400700D | no | 105/82 | 18 | .18/.18 |
| | 0.1% PDMS | med | 73/50 | | .18/.17 |
| | | high | 31/21 | | .27/.26 |
| 391-2 | SKMF502H | no | 113/75 | 14 | .19/.18 |
| | 0.1% PDMS | med | 104/474 | | .25/.24 |
| | | high | 36/23 | | .36/.32 |
| 391-3 | 1:1 Fina 6450: Basell PB8340 | no | 98/79 | 24 | .34/.31 |
| | 0.1% PDMS | med | 57/42 | | .36/.33 |
| | | high | 75/57 | | .37/.31 |
| 391-4 | Fina 6450 | no | 141/125 | 85 | .25/.23 |
| | 0.1% PDMS | med | 137/105 | | .23/.22 |
| | | high | 39/26 | | .24/.22 |

TABLE II

| Designation | wt % of Blend | Name | Description |
|---|---|---|---|
| 391-1 | 82 | Ampacet 40070D | proprietary commercial matte skin polymer |
| | 10 | Schulman IL2580Sc | 1% PDMS concentrate in C2C3 copolymer |
| | 5 | Schulman ABVT242Sc | 5% Tospearl T120 concentrate in C2C3 copolymer |
| | 3 | Ampacet 10919 | 3% active fluoroplastomer process aid in LDPE |
| 391-2 | 82 | SK MF502H | proprietary commercial matte skin polymer |
| | 10 | Schulman IL2580Sc | 1% PDMS concentrate in C2C3 copolymer |
| | 5 | Schulman ABVT242Sc | 5% Tospearl T120 concentrate in C2C3 copolymer |
| | 3 | Ampacet 10919 | 3% active fluoroplastomer process aid in LDPE |
| 391-3 | 41 | Fina 6450 | HDPE, 5MI, 0.962 density |
| | 41 | Basell 8340 | ethylene butene random copolymer |
| | 10 | Schulman IL2580Sc | 1% PDMS concentrate in C2C3 copolymer |
| | 5 | Schulman ABVT242Sc | 5% Tospearl T120 concentrate in C2C3 copolymer |
| | 3 | Ampacet 10919 | 3% active fluoroplastomer proceaa aid in LDPE |
| 391-4 | 82 | Fina 6450 | HDPE, 5MI, 0.962 density |
| | 10 | Schulman IL2580Sc | 1% PDMS concentrate in C2C3 copolymer |
| | 5 | Schulman ABVT242Sc | 5% Tospearl T120 concentrate in C2C3 copolymer |
| | 3 | Ampacet 10919 | 3% active fluoroplastomer process aid in LDPE |

The Ampacet 400700D and SKMF502H employed in samples 391-1 and 391-2, respectively, are commercial matte skin polymers including a formulation that is treated as proprietary by the suppliers. The Ampacet 400700D polymer is provided by Ampacet Corporation located in Terre Haute, Ind., and the SKMF502H polymer is provided by SK in Seoul, Korea.

Sample 391-3 is a 50/50 blend, by weight, of Fina 6540, sold by Total Petrochemicals, and Basell PB8340, sold by Basell USA, in Elkton, Md. The detailed formulation of 391-3 is set forth in Table II.

Sample 391-4 is a clear skin layer made of Fina 6450. The specific formulation of the skin layer is shown in Table II.

As will be noted in Table I, the highest cold seal adhesive release force for each sample was experienced with the sample that had no corona treatment.

It should be noted that the two numbers reported for each sample under the title CSR (cold seal release) force are the force required to initiate the peeling action and the force to continue the peeling action once it has been started, respectively. For example, sample 391-1, when exposed to high corona treatment, had an initiation seal release force of 31 g/in. and a seal release force of 21 g/in. to continue the release after it had been started. It is the second value; namely, the seal release force to continue release that is the significant value in this invention. Unless otherwise indicated, all further references to the cold seal release force in this application refers to the second value; namely, the force required to continue the releasing function after release has been initiated.

Except for sample 391-3, a reduction in CSR force in excess of 50% was experienced when comparing the skin layer with no corona treatment with the skin layer having a high corona treatment. For example, the peel strength for sample 391-1 went from 82 g/in. with no corona treatment to 21 g/in. with a high corona treatment. Sample 391-2 went from 75 g/in. with no corona treatment to 23 g/in. with high corona treatment.

The lack of satisfactory results for sample 391-3 was believed to result from the incomplete mixing of the two polymer formulations. However, even in this sample a reduction in CSR force was experienced by corona treating the layer. Moreover, as is reported later in this application, a very similar formulation that was properly blended gave results that were expected in this invention.

Sample 391-4 experienced a CSR of 125 g/in. without corona treatment and a CSR of 26 g/in. with a high corona treatment. This latter sample had a clear finish, as opposed to a matte finish, as evidenced by the 45° gloss value of 85.

The column farthest to the right shows both the static and kinetic coefficient of friction for the various samples. In the preferred embodiments of this invention the static coefficient of friction should be less than 0.5 and the kinetic coefficient of friction should be less than 0.4. More preferably the static coefficient of friction should be 0.35 or less and the kinetic coefficient of friction should be 0.25 or less. As is illustrated in Table I, the static coefficient of friction for all of the samples was less than 0.5 and the kinetic coefficient of friction was less than 0.4.

Table III below illustrates four additional samples; each including the same commercial matte skin polymer composition, but differing from each other in the particular amount and/or type of polydimethylsiloxane employed in the mix. The specific formulation of samples 397-1-397-4 are shown in following Table IV. It should be noted that the matte skin polymer composition is treated as proprietary by the manufacturer.

TABLE III

| Designation | Matte Composition | Corona Treatment | Room Temp. Blocking CSR force, g/in. | 45 deg glass | COF static/kinatic |
|---|---|---|---|---|---|
| 397-1 | SK MF502 | no | 119/92 | | |
| | 0.1% PDMS | high | 21/15 | 15 | .42/.36 |
| 397-2 | SKMF502H | no | 107/85 | | |
| | 0.1% HMW PDMS | high | 42/31 | 15 | .48/.39 |
| 397-3 | SK MF502H | no | 121/91 | | |
| | 0.2% PDMS | high | 19/13 | 10 | .17/.16 |
| 397-4 | SK MF502H | no | 85/62 | | |
| | 0.0% PDMS | high | 122/90 | 10 | .56/.45 |

TABLE IV

| Designation | wt % of Blend | Name | Description |
|---|---|---|---|
| 397-1 | 82 | SK MF502H | commercial matte skin polymer |
| | 10 | Schulman IL2580Sc | 1% PDMS concentrate in C2C3 copolymer |
| | 5 | Schulman ABVT242Sc | 5% Tospearl T120 concentrate in C2 C3 copolymer |
| | 3 | Ampacet 10919 | 3% active fluoroplastomer process aid in LDPE |
| 397-2 | 82 | SK MF502H | commercial matte skin polymer |
| | 10 | Schulman IL3580Sc | 1% PDMS concentrate in C2C3 copolymer (high viscosity) |
| | 5 | Schulman ABVT242Sc | 5% Tospearl T120 concentrate in C2 C3 copolymer |
| | 3 | Ampacet 10919 | 3% active fluoroplastomer process aid in LDPE |
| 397-3 | 72 | SK MF502H | commercial matte skin polymer |
| | 20 | Schulman IL2580Sc | 1% PDMS concentrate in C2C3 copolymer |
| | 5 | Schulman ABVT242Sc | 5% Tospearl T120 concentrate in C2 C3 copolymer |
| | 3 | Ampacet 10919 | 3% active fluoroplastomer process aid in LDPE |
| 397-4 | 92 | SK MF502H | commercial matte akin polymer |
| | 0 | Schulman IL2580Sc | 1% PDMS concentrate in C2C3 copolymer |
| | 5 | Schulman ABVT242Sc | 5% Tospearl T120 concentrate in C2 C3 copolymer |
| | 3 | Ampacet 10919 | 3% active fluoroplastomer process aid in LDPE |

Referring to Table III it should be noted that each of the three samples 397-1-397-3 had a reduction in cold seal release force well in excess of 50% by corona treating that layer. For example, 397-1 with no corona treatment had a cold seal release force of 92 g/in., which was reduced to 15 g/in. by high corona treatment. In sample 397-2 the cold seal release force without corona treatment was 85 g/in., which was reduced to 31 g/in. by high corona treatment. A similar result is shown for sample 397-3.

Sample 397-4 is a prior art structure that clearly confirms the unique and unexpected result achieved in this invention by including a silicone oil slip agent in a cold seal release formulation that then is oxidatively treated. Specifically, 397-4 included a commercial matte polymer formulation but with no silicone oil slip agent therein. In this product exposing the layer to high corona treatment, as opposed to no corona treatment, resulted in an increase in the cold seal release force from 62 g/in. to 90 g/in. This is exactly what was expected in the prior art when corona treating a cold seal release surface.

However, in accordance with the present invention, exposing samples having 0.1% of different molecular weight polydimethylsiloxane, as illustrated in samples 397-1 and 397-2, resulted in a substantial reduction in the cold seal release force. In a like manner, employing as much as 0.2% of polydimethylsiloxane in the blend, as illustrated in sample 397-3, resulted in a substantial reduction in the cold seal release force by the application of corona treatment. These results were completely unexpected.

An additional set of test product is identified in Table V. All of the samples identified in Table V include 0.1% of the same polydimethylsiloxane but different polymer blends of conventional matte formulations disclosed in the prior art. In other words, the specific blends in samples 399-1-399-6 are all reported in the literature as providing a matte surface.

TABLE V

| Designation | Matte Composition | Corona Treatment | Room Temp. Blocking |
|---|---|---|---|
| 399-1 | 1:1 Fina6450:SPX78L1 | no | 102/93 |
|  | 0.1% PDMS | high | 20/13 |
| 399-2 | 1:1 Fina 6450:SPX79E2 | no | 88/73 |
|  | 0.1% PDMS | high | 34/25 |
| 399-3 | 1:1 Fina 6450:Fina 8573 | no | 105/88 |
|  | 0.1% PDMS | high | 30/23 |
| 399-4 | 1:1 Fina 6450:Fina 1471 | no | 49/39 |
|  | 0.1% PDMS | high | 11/9 |
| 399-5 | 1:1 Fina 6450:Basell 8310M | no | 130/113 |
|  | 0.1% PDMS | high | 17/14 |
| 399-6 | 1:1 Exxon LD 135.09:SPX78L1 | no | 60/52 |
|  | 0.1% PDMS | high | 18/15 |

Table VI illustrates the specific formulation of the matte skin layers for each of samples 399-1-399-6.

TABLE VI

| Designation | wt % of blend | Name | Description |
|---|---|---|---|
| 399-1 | 41 | Fina 6450 | HDPE, 5MI, 0.962 density |
|  | 41 | Sumitomo SPX78 | ethylene propylene butene random terpolymer, 6MFR |
|  | 10 | Schulman IL2580Sc | 1% PDMS concentrate in C2C3 copolymer |
|  | 5 | Schulman ABVT242Sc | 5% Tospearl T 120 concentrate in C2C3 copolymer |
|  | 3 | Ampacet 10919 | 3% active fluoroplactomer process aid in LDPE |
| 399-2 | 41 | Fina 6450 | HDPE, 5MI, 0.962 density |
|  | 41 | Sumitomo SPX79 | propylene butene random copolymer, 6MFR |
|  | 10 | Schulman IL2580Sc | 1% PDMS concentrate in C2C3 copolymer |
|  | 5 | Schulman ABVT242Sc | 5% Tospearl T120 concentrate in C2C3 copolymer |
|  | 3 | Ampacet 10919 | 3% active fluoroplastomer process aid in LDPE |
| 399-3 | 41 | Fina 6450 | HDPE, 5MI, 0.962 density |
|  | 41 | Fina 8573 | ethylene propylene random copolymer 5MFR |
|  | 10 | Schulman IL2580Sc | 1% PDMS concentrate in C2C3 copolymer |
|  | 5 | Schulman ABVT242Sc | 5% Tospearl T120 concentrate in C2C3 copolymer |
|  | 3 | Ampacet 10919 | 3% active fluoroplastomer process aid in LDPE |
| 399-4 | 41 | Fina 6450 | HDPE, 5MI, 0.962 density |
|  | 41 | Fina 1471 | syndiotactic polypropylene, 15MFR |
|  | 10 | Schulman IL2580Sc | 1% PDMS concentrate in C2C3 copolymer |
|  | 5 | Schulman ABVT242Sc | 5% Tospearl T120 concentrate in C2C3 copolymer |
|  | 3 | Ampacet 10919 | 3% active fluoroplastomer process aid in LDPE |
| 399-5 | 41 | Fina 6450 | HDPE, 5MI, 0.962 density |
|  | 41 | Basell 8310M | ethylene butene random copolymer |
|  | 10 | Schulman IL2580Sc | 1% PDMS concentrate in C2C3 copolymer |
|  | 5 | Schulman ABVT242Sc | 5% Tospearl T120 concentrate in C2C3 copolymer |
|  | 3 | Ampacet 10919 | 3% active fluoroplastomer process aid in LDPE |
| 399-6 | 41 | Exxon LD135.09 | LDPE, 5MI, 0.92 density |
|  | 41 | Basell 8340 | ethylene butene random copolymer |
|  | 10 | Schulman IL2580Sc | 1% PDMS concentrate in C2C3 copolymer |
|  | 5 | Schulman ABVT242Sc | 5% Toapearl T120 concentrate in C2C3 copolymer |
|  | 3 | Ampacet 10919 | 3% active fluoroplastomer process aid in LDPE |

The gloss and C.O.F. values were not recorded for samples 399-1-399-6. As will be noted in Table V, exposing the various skin layers to high corona treatment resulted in a substantial reduction in the cold seal release force. In particular, the reduction in all samples was well in excess of 50%, as compared to the same skin layer without corona treatment.

An additional point which should be noted is that sample 399-5 essentially is the same formulation as sample 391-3 reported in Table I, but with the specific polymers having been adequately blended. It should be noted that the adequate blending of the polymers resulted in a cold seal release force of 14 g/in. when the layer was exposed to high corona treatment. This compares to a cold seal release force of 57 g/in. in sample 391-3, wherein the blend was not considered to be adequately mixed or blended.

Although the various examples disclosed herein included oxidative treatment by corona treatment, applicant has determined that a similar reduction in cold seal release force can be obtained by flame treatment. Applicant believes that other oxidative treatment processes may also be usable to obtain the desired benefits of this invention. Although oxidative treatment by flame treatment is considered to be within the scope of this invention, such treatment resulted in other film properties being less desirable than the samples treated with corona treatment. Therefore, corona treatment of the release layer is preferred in the present invention.

In accordance with the broadest aspect of applicant's invention, the oxidative treatment of the skin layer should reduce the cold seal release force by at least 25%, as compared to a non-oxidatively treated layer. For example, if the peel force of a non-oxidatively treated layer were 80 g/in., then the oxidatively treated layer in accordance with this invention should have a cold seal release force of no greater than 60 g/in. [80−(25% of 80)=60].

In the most preferred embodiments of this invention, the cold seal release force should be reduced by an amount in excess of 50% from that of a non-oxidatively treated layer. The high corona treatment of each of the samples reported in Tables I, III and IV, except for sample 391-3 which was not properly manufactured and sample 397-4 which did not employ the present invention, achieved a reduction in cold seal release force well in excess of 50%, as compared to the same layer with no corona treatment.

In accordance with the preferred embodiments of this invention the percentage of silicone oil slip agent employed, in the release layer should be at least 0.05%; more preferably at least 0.1% and most preferably in the range of 0.1%-0.2%.

It should be understood that it is not possible to accurately quantify a value representative of medium or high corona treatment due to the insensitivity of the dyne solution and contact angle surface energy measurement techniques that commonly are employed. However, individuals skilled in the art understand the levels of treatment that generally qualify as medium and high. More significantly, based upon the teachings in this application individuals skilled in the art can clearly adjust the level of corona treatment to obtain the desired and/or necessary reduction in cold seal release force of the release layer in a cold seal release film.

It should be understood that the particular cold seal adhesive utilized in this invention does not constitute a limitation on the broadest aspects of this invention. It is believed that most commercially available, well known cold seal adhesives can be employed in the present invention. For example, the cold seal adhesives specifically described in the various Wilkie patents that already have been incorporated herein by references are believed to be suitable for use in the instant invention. Stating this another way, applicant is not aware of any special properties that are required in cold seal adhesives to achieve the benefits of this invention, as already have been described in detail.

While the invention has been described in detail and with reference to specific examples thereof, it will be apparent to one skilled in the art that various changes and modifications can be made therein without departing from the spirit and scope thereof.

What I claim as my invention is the following:

1. A packaging film including a cold seal release film comprising a cold seal release layer for releasably engaging a cold seal adhesive, said packaging film having a cold seal receptive layer opposed to said cold seal release layer, said cold seal receptive layer retaining the cold seal adhesive thereon, said cold seal adhesive retained on said receptive layer being releasably engageable from said cold seal release layer; said cold seal release layer including a silicone oil slip agent therein and being oxidatively treated to reduce the release force of the release layer to the cold seal adhesive in engagement therewith relative to the release force of the release layer to the cold seal adhesive prior to said release layer being oxidatively treated.

2. The packaging film of claim 1, said cold seal release layer comprising predominately one or more polyolefin polymers.

3. The packaging film of claim 1, wherein said cold seal release layer has a matte finish having a 45 degree gloss less than 30.

4. The packaging film of claim 1, wherein said cold seal release layer has a matte finish with a 45 degree gloss of 15 or less.

5. The packaging film of claim 1, wherein said cold seal release layer has a matte finish with a 45 degree gloss of 10 or less.

6. The packaging film of claim 3, wherein said cold seal release layer has a static coefficient of friction of less than 0.5 and a kinetic coefficient of friction of less than 0.4.

7. The packaging film of claim 3, wherein said cold seal release layer has a static coefficient of friction less than 0.35 and a kinetic coefficient of friction of less than 0.25.

8. The packaging film of claim 1, wherein said oxidative treatment is corona treatment.

9. The packaging film of claim 1, wherein said silicone oil is polydimethylsiloxane.

10. The packaging film of claim 9, wherein said polydimethylsiloxane is present in an amount of at least 0.0 5% by weight of the cold seal release layer.

11. The packaging film of claim 1 being in a roll with the cold seal adhesive retained on the cold seal adhesive receptive layer releasably engaging the cold seal release layer.

12. The packaging film of claim 1 wherein the cold seal adhesive receptive layer to which the cold seal adhesive is retained is a layer of the cold seal release film opposed to said cold seal release layer.

13. The packaging film of claim 1 including a second film adhered to the cold seal release film, said cold seal adhesive receptive layer opposed to said cold seal release layer being an exposed surface of said second film.

14. A method of making a packaging film including a cold seal release layer thereon for releasably engaging a cold seal adhesive, said method including the following steps:

a. forming a cold seal release film with said cold seal release layer on one surface, said cold seal release layer including a polymer composition having cold seal release properties and including in that polymer composition a silicone oil slip agent;

b. oxidatively treating said cold seal release layer at a level to reduce the cold seal release force to said cold seal adhesive at least 25% of the cold seal release force before oxidative treatment;

c. applying the cold seal adhesive to a cold seal adhesive receptive layer opposed to said cold seal release layer for retaining said cold seal adhesive on said receptive layer; and d. bringing said cold seal adhesive retained on the receptive layer into releasable engagement with the cold seal release layer.

15. The method of claim 14 including forming the cold seal release layer from predominantly one or more polyolefin polymers.

16. The method of claim 14 including employing a polymer composition for the release layer that provides a matte finish having a 45 degree gloss less than 30.

17. The method of claim 14 including employing a polymer composition for the release layer that provides a matte finish having a 45 degree gloss of 15 or less.

18. The method of claim 14 including employing a polymer composition for the release layer that provides a matte finish having a 45 degree gloss of 10 or less.

19. The method of claim 14 wherein said oxidative treatment is corona treatment.

20. The method of claim 14 wherein the silicone oil slip agent is added in an amount of at least 0.05% by weight of the cold seal release layer.

21. The method according to claim 14 wherein the silicone oil slip agent is added in an amount of at least 0.1% by weight of the layer.

22. The method of claim 14 wherein the silicone oil slip agent that is added is polydimethylsiloxane.

23. The method of claim 14, wherein the cold seal adhesive receptive layer is a layer of the cold seal release film opposed to the cold seal release layer, said step of forming the packaging film includes applying the cold seal adhesive to the receptive layer of the cold seal release film.

24. The method of claim 14 including the additional step of laminating the cold seal release film to a second film, said cold seal adhesive receptive layer being a layer of said second film.

25. The method of claim 24 wherein the cold seal release film is a clear film.

\* \* \* \* \*